US 8,867,416 B2

(12) United States Patent
Wu

(10) Patent No.: US 8,867,416 B2
(45) Date of Patent: Oct. 21, 2014

(54) METHOD AND APPARATUS FOR CONTROLLING LOAD BALANCE

(71) Applicant: Huawei Technologies Co., Ltd., Shenzhen (CN)

(72) Inventor: Weike Wu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 94 days.

(21) Appl. No.: 13/728,255

(22) Filed: Dec. 27, 2012

(65) Prior Publication Data
US 2013/0114406 A1 May 9, 2013

Related U.S. Application Data

(63) Continuation of application No. PCT/CN2012/071423, filed on Feb. 22, 2012.

(30) Foreign Application Priority Data

Feb. 28, 2011 (CN) .......................... 2011 1 0048494

(51) Int. Cl.
H04B 7/00 (2006.01)
H04W 36/22 (2009.01)
H04W 28/08 (2009.01)
H04W 36/14 (2009.01)

(52) U.S. Cl.
CPC ............. *H04W 36/22* (2013.01); *H04W 36/14* (2013.01); *H04W 28/08* (2013.01)
USPC ......................................... 370/310

(58) Field of Classification Search
CPC ..... H04W 36/14; H04W 36/16; H04W 36/18; H04W 36/22

USPC .......... 370/310, 328, 331, 342; 455/422, 436, 455/442–444, 450, 453
See application file for complete search history.

(56) References Cited

U.S. PATENT DOCUMENTS 7,551,586 B1 * 6/2009 Yew et al. ...................... 370/332
8,000,286 B1 * 8/2011 Barbee et al. ................. 370/328
(Continued)

FOREIGN PATENT DOCUMENTS

CN 1581996 2/2005
CN 1738479 2/2006
(Continued)

OTHER PUBLICATIONS

International Search Report, dated May 17, 2012, in corresponding International Application No. PCT/CN2012/071423 (6 pp.).

(Continued)

Primary Examiner — Dmitry H Levitan
(74) Attorney, Agent, or Firm — Staas & Halsey LLP

(57) ABSTRACT

A method for controlling a load balance between a CDMA2000 1X EV-DO network and a CDMA2000 1X network is provided. A base station controller (BSC) in the CDMA2000 1X EV-DO network receives a connection request message sent by a terminal, determines that a load of the CDMA2000 1X EV-DO network is higher than a threshold, sends a load query message to a BSC in the CDMA2000 1X network, receives a load query response message indicating that the CDMA2000 1X network is not overloaded from the BSC in the CDMA2000 1X network, and sends a system switchover message to the BSC in the CDMA2000 1X network to instruct the BSC in the CDMA2000 1X network to switch the terminal from the CDMA2000 1X EV-DO network to the CDMA2000 1X network.

10 Claims, 4 Drawing Sheets

(56) References Cited

U.S. PATENT DOCUMENTS

| | | | |
|---|---|---|---|
| 8,023,948 B2* | 9/2011 | Han | 455/440 |
| 8,121,607 B2* | 2/2012 | Fang et al. | 455/453 |
| 8,259,606 B1* | 9/2012 | Singh et al. | 370/252 |
| 8,285,291 B2* | 10/2012 | Dinan et al. | 455/443 |
| 8,385,216 B1* | 2/2013 | Shetty et al. | 370/252 |
| 8,504,056 B2* | 8/2013 | Fang et al. | 455/453 |
| 8,520,526 B2* | 8/2013 | Song | 370/236 |
| 8,537,774 B2* | 9/2013 | Robson et al. | 370/331 |
| 2005/0070280 A1* | 3/2005 | Jung et al. | 455/434 |
| 2006/0153134 A1* | 7/2006 | Lee et al. | 370/331 |
| 2007/0161399 A1* | 7/2007 | Hata | 455/550.1 |
| 2007/0178906 A1 | 8/2007 | Gao et al. | |
| 2011/0009126 A1 | 1/2011 | Lee | |

FOREIGN PATENT DOCUMENTS

| | | |
|---|---|---|
| CN | 1757168 | 4/2006 |
| CN | 1757180 A | 4/2006 |
| CN | 1784066 A | 6/2006 |
| CN | 101262698 A | 9/2008 |
| CN | 101873637 A | 10/2010 |
| CN | 102111815 | 6/2011 |
| KR | 10-2005-0022718 | 3/2005 |

OTHER PUBLICATIONS

Form PCT/ISA/220, dated May 17, 2012, in corresponding International Application No. PCT/CN2012/071423 (3 pp.).

Form PCT/ISA/237, dated May 17, 2012, in corresponding International Application No. PCT/CN2012/071423 (4 pp.).

Chinese Search Report mailed Jan. 4, 2013 for corresponding Chinese Application No. 2011100484947.

International Search Report, dated May 17, 2012, in corresponding International Application No. PCT/CN2012/071423 (4 pp.).

* cited by examiner

METHOD AND APPARATUS FOR CONTROLLING LOAD BALANCE

CROSS-REFERENCE TO RELATED APPLICATIONS

This application is a continuation of International Application No. PCT/CN2012/071423, filed Feb. 22, 2012, titled "METHOD AND APPARATUS FOR CONTROLLING LOAD BALANCE", which claims priority to Chinese Patent Application No. 201110048494.7, filed with the Chinese Patent Office on Feb. 28, 2011 and titled "METHOD AND APPARATUS FOR CONTROLLING LOAD BALANCE", both of which are incorporated herein by reference in their entireties.

FIELD

The present disclosure relates to the field of communications technologies, and particularly to a method and an apparatus for controlling a load balance.

BACKGROUND

Code Division Multiple Access (CDMA) 1X refers to the first phase of CDMA 2000. A forward link data rate may reach 144 Kbps. Packet switching is introduced to a network part, which can support a mobile Internet Protocol (IP) service. A CDMA 1X network may serve as a platform for bearing a voice service, and may also serve as a platform for bearing packet data of wireless access to the Internet. It not only can provide a conventional voice service for a user, but also can provide a data service in end-to-end packet transmission mode for the user.

The CDMA2000 1X EV-DO standard originates from a High Data Rate (HDR) technology of the Qualcomm company. Qualcomm proposed the concept of HDR to the CDMA Development Group (CDG) as early as in 1997. An official technical solution entitled CDMA2000 1X EV-DO was submitted to the 3rd Generation Partnership Project 2 (3GPP2) in March 2000 after constant improvements and experiments. 1X EV means 'Evolution' and indicates a development of the standard. DO means Data Only or Data Optimized, indicating that the EV-DO technology is an efficient method for enhancing a CDMA2000 1X network in the aspect of providing a data service.

At present, a CDMA2000 1X EV-DO system (DO system for short) provides a data service for a terminal, and separates a high-rate packet data service from low-rate voice and data services. The high-rate packet data service is provided by an individual carrier, whereas a conventional low-rate voice service and a medium- and low-rate packet data service are still provided by a 1X system. The Qualcomm company provides an interoperability rule of a hybrid access terminal (HAT) to achieve compatibility and interoperability of the DO system and the CDMA2000 1X system (1X system for short). The HAT includes a 1X/DO dual-mode terminal. The rule specifies that a voice service preferentially access the 1X system, whereas the data service preferentially access the DO system. Therefore, when the HAT performs the data service in a 1X/DO hybrid system, the DO system is accessed preferentially.

To increase spectrum efficiency, in the 1X/DO hybrid system, in a case that the DO system that preferentially processes the data service has a high load whereas the 1X system has a low load, an operator expects that the 1X system is capable of sharing the load of the DO system to balance the loads of the DO system and the 1X system. However, no technical solution in the prior art is capable of solving a problem of balancing loads between the DO system and the 1X system.

SUMMARY

Embodiments of the present invention provide a method and an apparatus for controlling a load balance, which are capable of achieving the load balance between a CDMA2000 1X EV-DO system and a CDMA2000 1X system.

A method for controlling a load balance between a CDMA2000 1X EV-DO network and a CDMA2000 1X network, which includes:
receiving, by a base station controller (BSC) in the CDMA2000 1X EV-DO network, a connection request message sent by a terminal in the CDMA2000 1X EV-DO network;
determining, by the BSC in the CDMA2000 1X EV-DO network, that a load of the CDMA2000 1X EV-DO network is higher than a threshold;
sending, by the BSC in the CDMA2000 1X EV-DO network, a load query message for querying a load status of the CDMA2000 1X network to a BSC in the CDMA2000 1X network after determining that the load of the CDMA2000 1X EV-DO network is higher than the threshold;
receiving, by the BSC in the CDMA2000 1X EV-DO network, a load query response message sent by the BSC in the CDMA2000 1X network, wherein the load query response message indicates that the CDMA2000 1X network is not overloaded; and
in responsive to the load query response message, sending, by the BSC in the CDMA2000 1X EV-DO network, a system switchover message to the BSC in the CDMA2000 1X network to instruct the BSC in the CDMA2000 1X network to switch the terminal from the CDMA2000 1X EV-DO network to the CDMA2000 1X network.

A base station controller (BSC), which includes:
a processor; and
a non-transitory computer readable storage medium storing programming for execution by the processor, the programming including instructions to:
receive a connection request message sent by a terminal in a CDMA2000 1X EV-DO network;
determine that a load of the CDMA2000 1X EV-DO network is higher than a threshold;
after determining that the load of the CDMA2000 1X EV-DO network is higher than the threshold, send a load query message for querying a load status of a CDMA2000 1X network to a BSC in the CDMA2000 1X network;
receive a load query response message sent by the BSC in the CDMA2000 1X network, wherein the load query response message indicates that the CDMA2000 1X network is not overloaded; and
in responsive to the load query response message, send a system switchover message to the BSC in the CDMA2000 1X network to instruct the BSC in the CDMA2000 1X network to switch the terminal from the CDMA2000 1X EV-DO network to the CDMA2000 1X network.

A method for controlling a load balance between a CDMA2000 1X EV-DO network and a CDMA2000 1X network, which includes:
receiving, by a base station controller (BSC) in the CDMA2000 1X network, a load query message for querying a load status of the CDMA2000 1X network sent by an access network of the CDMA2000 1X EV-DO network;

in response to the load query message, determining, by the BSC, that the load of the CDMA2000 1X network is not higher than a threshold;

after determining that the load of the CDMA2000 1X network is not higher than the threshold, sending, by the BSC, a load query response message indicating that the CDMA2000 1X network is not overloaded to the access network of the CDMA2000 1X EV-DO network;

receiving, by the BSC, a system switchover message sent by the access network of the CDMA2000 1X EV-DO network; and in responsive to the system switchover message, switching, by the BSC, a terminal from the CDMA2000 1X EV-DO network to the CDMA2000 1X network.

A base station controller (BSC), which includes:

a processor; and a non-transitory computer readable storage medium storing programming for execution by the processor, the programming including instructions to:

receive a load query message for querying a load status of a CDMA2000 1X network from an access network of a CDMA2000 1X EV-DO network;

in response to the load query message, determine that the load of the CDMA2000 1X network is not higher than a threshold;

after determining that the load of the CDMA2000 1X network is not higher than the threshold, send a load query response message indicating that the CDMA2000 1X network is not overloaded to the access network of the CDMA2000 1X EV-DO network;

receive a system switchover message instructing the BSC to switch a terminal in the CDMA2000 1X EV-DO network to the CDMA2000 1X network, from the access network of the CDMA2000 1X EV-DO network; and in responsive to the system switchover message, switch the terminal from the CDMA2000 1X EV-DO network to the CDMA2000 1X network.

According to some embodiments of the present invention, when the load of the DO system is higher than the first threshold, the load query message is sent to the BSC of the 1X system. When the 1X system is not overloaded, the HAT is switched from the DO system to the 1X system. Compared with the prior art where the load balance of the DO system and the 1X system may not be achieved, the technical solutions provided in some embodiments of the present invention may be used for switching the HAT from the DO system to the 1X system, when the DO system is overloaded and the 1X system is not overloaded, thereby achieving the load balance of the DO system and the 1X system.

BRIEF DESCRIPTION OF THE DRAWINGS

To illustrate technical solutions in embodiments of the present invention or in the prior art more clearly, the following briefly describes accompanying drawings required for describing the embodiments or the prior art. Apparently, the accompanying drawings in the following description merely show some embodiments of the present invention, and persons of ordinary skill in the art can derive other drawings from these accompanying drawings without creative efforts.

DETAILED DESCRIPTION OF THE EMBODIMENTS

Technical solutions according to the embodiments of the present invention are described clearly and completely in the following with reference to accompanying drawings in the embodiments of the present invention. Apparently, the described embodiments are merely part rather than all of the embodiments of the present invention. All other embodiments obtained by persons of ordinary skill in the art based on the embodiments of the present invention without creative efforts shall fall within the protection scope of the present invention.

In the following embodiments, a load balance between a CDMA2000 1X EV-DO system and a CDMA2000 1X system is used as an example for illustration. The CDMA2000 1X EV-DO system is referred to as a DO system for short, and the CDMA2000 1X system is referred to as a 1X system for short.

Embodiment 1

Figure 1:
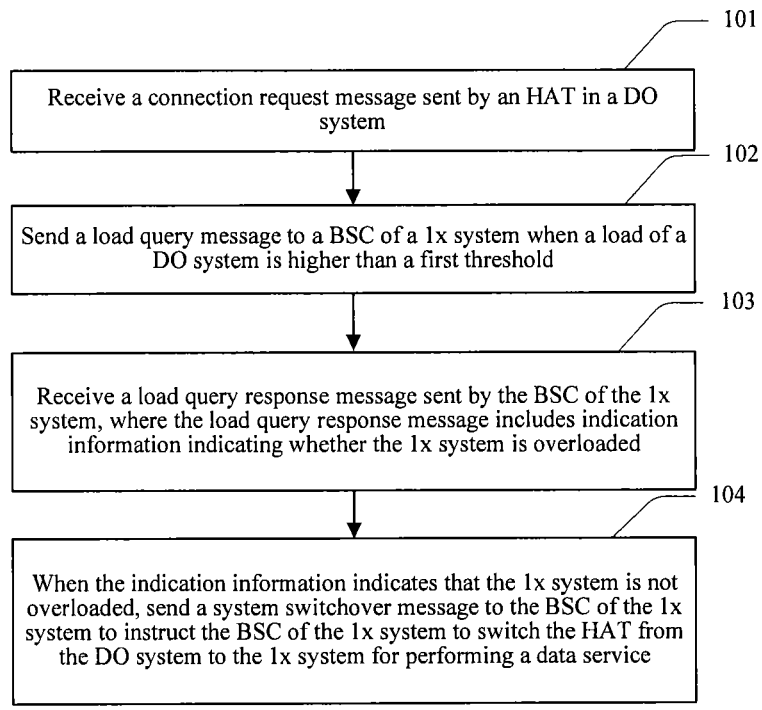
FIG. 1 is a flow chart of a method for controlling a load balance according to Embodiment 1 of the present invention.

This embodiment provides a method for controlling a load balance. As shown in FIG. 1, the method includes:

Step 101: Receive a connection request message sent by a hybrid access terminal (HAT) in a DO system.

Step 102: Send a load query message to a base station controller (BSC) of a 1X system when a load of the DO system is higher than a first threshold.

Whether the load of the DO system is higher than the first threshold needs to be determined before step 102. When the load of the DO system is higher than the first threshold, the load query message is sent to the BSC of the 1X system.

Step 103: Receive a load query response message sent by the BSC of the 1X system, where the load query response message includes indication information indicating whether the 1X system is overloaded.

Step 104: When the indication information indicates that the 1X system is not overloaded, send a system switchover message to the BSC of the 1X system to instruct the BSC of the 1X system to switch the HAT from the DO system to the 1X system for performing a data service.

The executor of the foregoing steps may be an Access Network (AN) of the DO system, and specifically, may be a BSC in the AN of the DO system.

Figure 2:
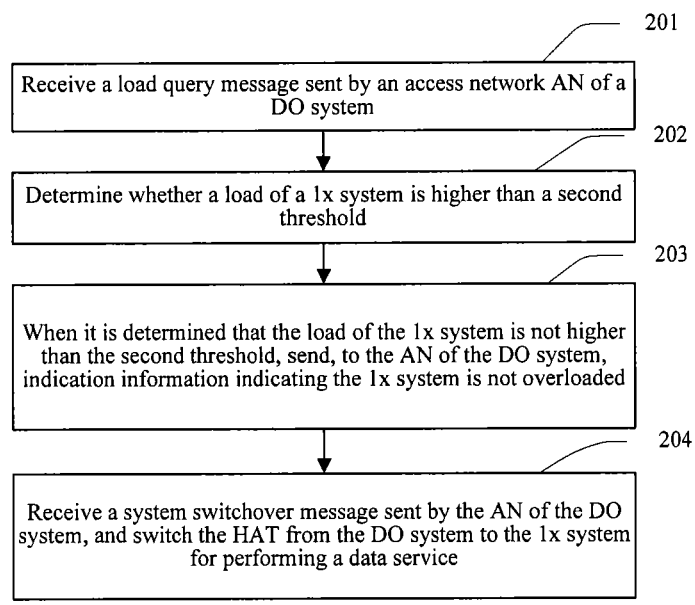
FIG. 2 is a flow chart of another method for controlling a load balance according to Embodiment 1 of the present invention.

This embodiment further provides another method for controlling a load balance, as shown in FIG. 2. The method includes:

Step 201: Receive a load query message sent by an access network (AN) of a DO system;

Step 202: Determine whether a load of a 1X system is higher than a second threshold;

Step 203: When it is determined that the load of the 1X system is not higher than the second threshold, send, to the AN of the DO system, indication information indicating that the 1X system is not overloaded; and Step 204: Receive a system switchover message sent by the AN of the DO system, and switch an HAT from the DO system to the 1X system for performing a data service.

The executor of the foregoing steps may be a BSC of the 1X system.

Figure 3:
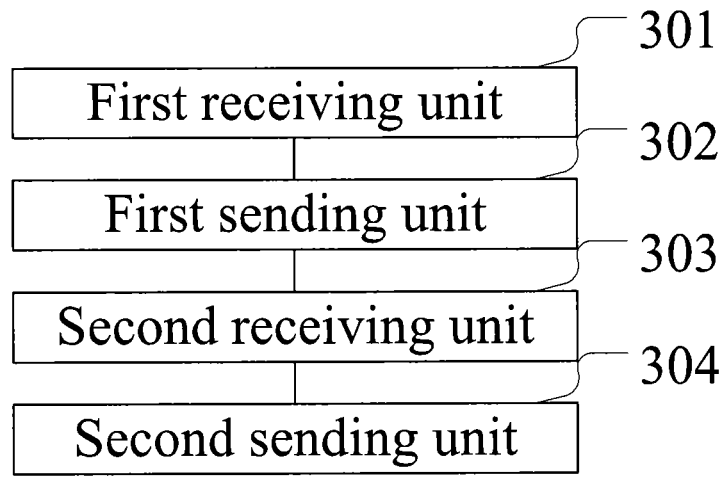
FIG. 3 is a block diagram of an apparatus for a load balance according to Embodiment 1 of the present invention.

To implement the foregoing method for controlling a load balance, an apparatus for a load balance is provided. As shown in FIG. 3, the apparatus includes a first receiving unit 301, a first sending unit 302, a second receiving unit 303, and a second sending unit 304.

The first receiving unit 301 is configured to receive a connection request message sent by a HAT in a DO system;

the first sending unit 302 is configured to send a load query message to a BSC of a 1X system when a load of the DO system is higher than a first threshold;

the second receiving unit 303 is configured to receive a load query response message sent by the BSC of the 1X system, where the load query response message includes indication information indicating whether the 1X system is overloaded; and the second sending unit 304 is configured to, when the indication information indicates that the 1X system is not overloaded, send a system switchover message to the BSC of the 1X system to instruct the BSC of the 1X system to switch the HAT from the DO system to the 1X system for performing a data service.

Figure 4:
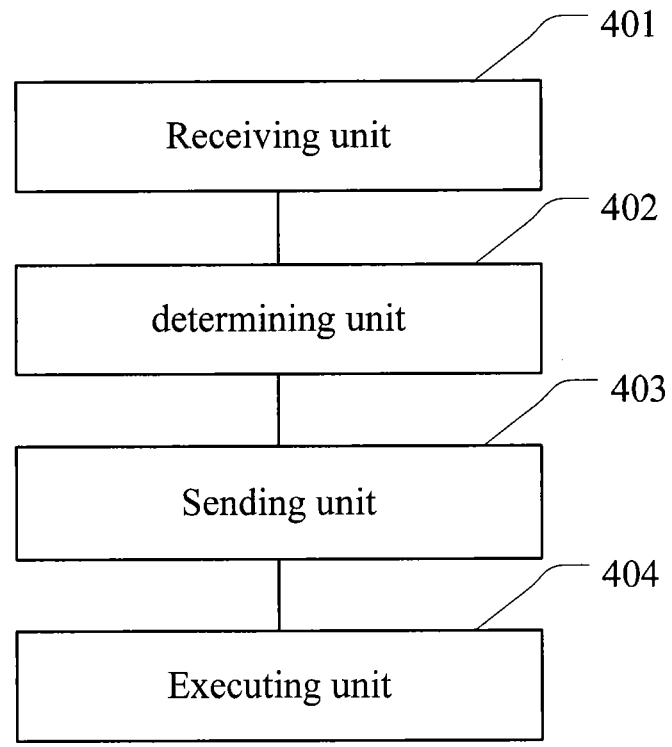
FIG. 4 is a block diagram of another apparatus for a load balance according to Embodiment 1 of the present invention.

The apparatus shown in FIG. 3 may be an AN of the DO system, and specifically, may be a BSC in the AN of the DO system. To implement determining the load of the 1X system, an apparatus for a load balance is further provided, as shown in FIG. 4. The apparatus includes a receiving unit 401, a determining unit 402, a sending unit 403 and an executing unit 404.

The receiving unit 401 is configured to receive a load query message sent by an AN of a DO system;

the determining unit 402 is configured to determine whether a load of a 1X system is higher than a second threshold;

the sending unit 403 is configured to, when it is determined that the load of the 1X system is not higher than the second threshold, send, to the AN of the DO system, indication information indicating that the 1X system is not overloaded; and the executing unit 404 is configured to receive a system switchover message sent by the AN of the DO system, and switch an HAT from the DO system to the 1X system for performing a data service.

The apparatus shown in FIG. 4 may be a BSC of the 1X system.

In this embodiment, a connection request message sent by the HAT in the DO system is received and the AN of the DO system determines the load of the DO system. When the load of the DO system is higher than the first threshold, a load query message is sent to the BSC of the 1X system, and then the BSC of the 1X system determines the load of the 1X system. When the load of the 1X system is lower than the second threshold, the AN of the DO system sends a system switchover message to the BSC of the 1X system to instruct the BSC of the 1X system to switch the HAT from the DO system to the 1X system for performing a data service. That is, when the DO system has a high load and the 1X system has a low load, the HAT is switched from the DO system to the 1X system for performing a data service. In this way, a problem that a load balance cannot be achieved between the DO system and the 1X system in the prior art is solved, and the load balance is achieved between the DO system and the 1X system.

Embodiment 2

It should be noted that the application scenario provided in the embodiment of the present invention is as follows: An HAT initiates a connection request in a DO system when needing to perform data service processing, and when the DO system has a high load, the HAT may be switched to a 1X system to perform data service processing, so as to achieve an objective of a load balance between the DO system and the 1X system.

Figure 5:
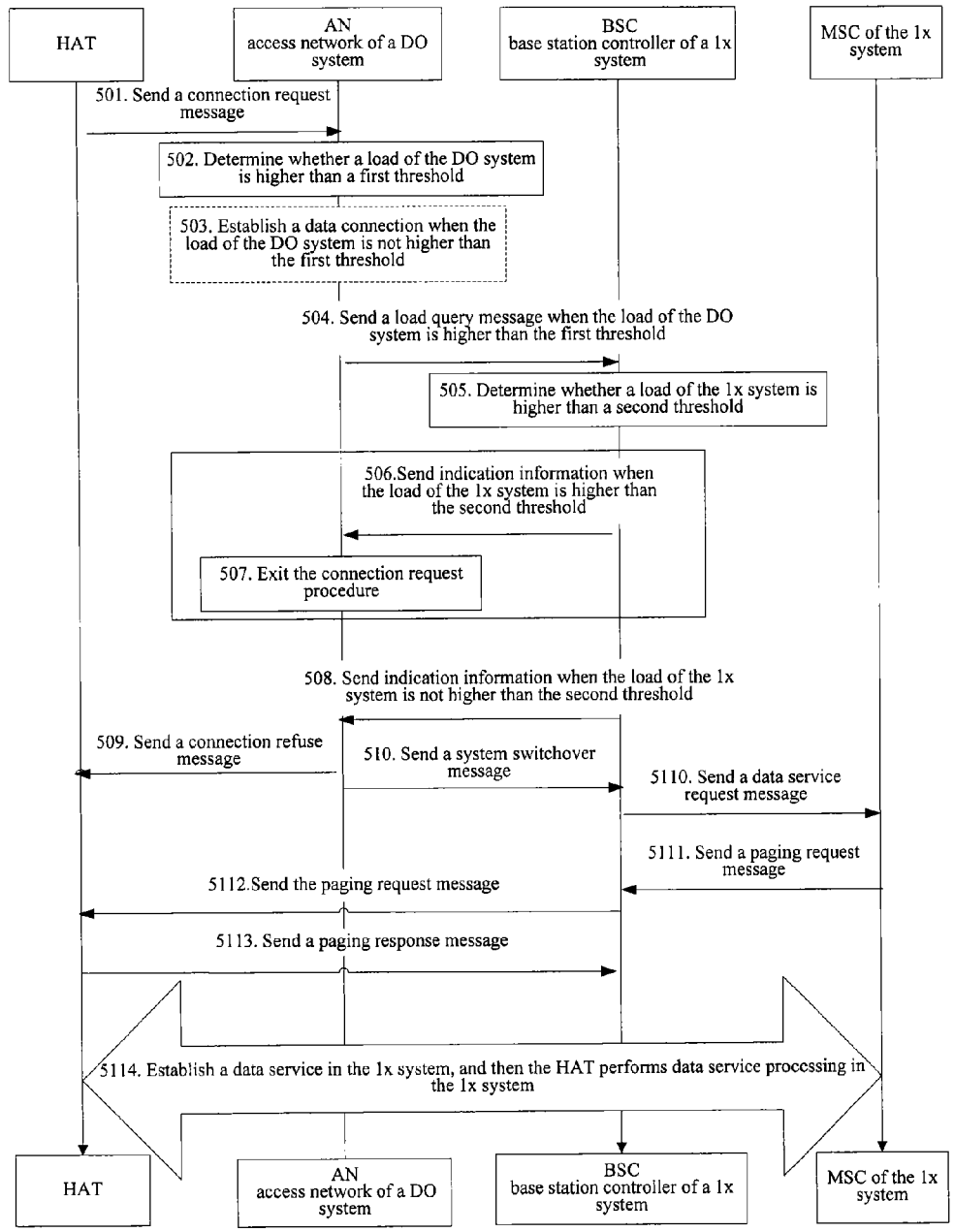
FIG. 5 is a flow chart of a method for controlling a load balance according to Embodiment 2 of the present invention.

This embodiment provides a method for controlling a load balance. As shown in FIG. 5, the method includes:

Step 501: An HAT sends a connection request message to an AN of a DO system in the DO system.

Step 502: The AN of the DO system receives the connection request message sent by the HAT in the DO system, and determines whether a load of the DO system is higher than a first threshold.

In general, the AN is an access system between a service node of a telecommunication department and a user terminal device, enables the user terminal device to access the service node and is an access network that supports comprehensive access of multiple types of services including narrowband and broadband services. The AN in the embodiment of the present invention may be an access network in the DO system, generally includes a Base Transceiver Station (BTS) and a base station controller (BSC).

For example, the load may be determined by the number of users in a cell. The first threshold is configured by a user according to practical experiences and used to determine whether the DO system is overloaded. When the number of users in the cell is greater than the first threshold, it indicates that the load of the DO system is higher than the first threshold.

Step 503: Establish a data service connection for the HAT in the DO system when the load of the DO system is not higher than the first threshold.

When the load of the DO system is not higher than the first threshold, it indicates that the DO system is not overloaded, and a data service may be performed by the DO system.

Step 504: When the load of the DO system is higher than the first threshold, the AN of the DO system sends a load query message to a BSC of a 1X system, where the BSC is applied in the 1X system.

When the load of the DO system is higher than the first threshold, it means that the DO system is overloaded, and the DO system cannot perform the data service for the user (e.g., the HAT). Therefore, in this step, the load query message is further sent to the BSC to find whether the 1X system can perform the data service.

Step 505: The BSC of the 1X system receives the load query message sent by the AN of the DO system, and determines whether a load of the 1X system is higher than a second threshold.

The BSC is a connection node between a base transceiver station and a mobile switch center, having main functions of performing wireless channel management, establishing and releasing a call and a communication link, controlling a cross-cell handover of a mobile station in this controlling cell, and so on.

In the embodiment of the present invention, the BSC of the 1X system may inquire the load of the 1X system, and determine whether the 1X system is overloaded.

The second threshold is used to determine whether the 1X system is overloaded. The second threshold is set in a manner similar to the first threshold. For details, reference may be made to the manner for setting the first threshold in step 502.

Step 506: When it is determined that the load of the 1X system is higher than the second threshold, send, to the AN of the DO system, indication information indicating that the 1X system is overloaded.

Step 507: Exit the connection request procedure of the HAT when the indication information indicates that the 1X system is overloaded.

When the DO system is overloaded and the 1X system is also overloaded, it indicates that neither the DO system nor the 1X system can perform the data service, and then the connection request procedure of the HAT is exited.

Step 508: When it is determined that the load of the 1X system is not higher than the second threshold, send, to the AN of the DO system, indication information indicating that the 1X system is not overloaded.

Step 509: The AN of the DO system receives a load query response message sent by the BSC of the 1X system, where the load query response message includes indication information indicating whether the 1X system is overloaded. When the indication information indicates that the load of the 1X system is not overloaded, the AN of the DO system sends a connection refuse message to the HAT, to notify the HAT that a service connection cannot be established in the DO system.

Step 510: When the indication information indicates that the 1X system is not overloaded, the AN of the DO system sends a system switchover message to the BSC of the 1X system to instruct the BSC of the 1X system to switch the HAT from the DO system to the 1X system for performing the data service.

When the DO system is overloaded and the 1X system is not overloaded, the AN of the DO system sends the connection refuse message to the HAT to notify the HAT that the service connection cannot be established in the DO system; and the AN of the DO system sends the system switchover message to the BSC of the 1X system. At this time, to relieve the load of the DO system, the system switches a data service to be processed in the DO system to the 1X system to perform the data service, so as to achieve a data service load balance of the DO system and the 1X system.

Step 511: The BSC of the 1X system receives the system switchover message sent by the AN of the DO system, and switches the HAT from the DO system to the 1X system for performing the data service.

Specifically, after the BSC of the 1X system receives the system switchover message sent by the AN of the DO system, a process that the 1X system establishes the data service and performs data service processing may be implemented by adopting the following sub-steps:

Step 5110: Send a data service request message to a Mobile Switch Center (MSC) of the 1X system when the BSC of the 1X system receives the system switchover message sent by the AN of the DO system;

Step 5111: The MSC of the 1X system sends a paging request message to the BSC of the 1X system;

Step 5112: The BSC of the 1X system sends the received paging request message to the HAT;

Step 5113: The HAT receives the paging request message, and sends a paging response message to the BSC of the 1X system; and Step 5114: After receiving the paging response message sent by the HAT, the BSC of the 1X system establishes a data service connection to the 1X system, and the HAT may perform data service processing in the 1X system.

It should be noted that a solution for switching from the DO system to the 1X system in a 1X/DO hybrid system is provided in the prior art. When the HAT initiates a call request connection in the DO system, if a problem occurs in the DO system, for example, when the DO system has a high load, the DO system sends a connection refuse message to the HAT. The HAT receives the connection refuse message from the DO system, stops a DO system operation, and controls the call connection to be switched to the 1X system (e.g., by using a MSM chip in the HAT). Then, the HAT reinitiates the call request connection in the 1X system, and completes an operation of receiving or sending data in the 1X system. However, the solution provided in the prior art requires cooperation of a terminal to upgrade a large number of MSM chips. Therefore, the terminal needs to pay a high price. Moreover, the solution provided in the prior art cannot solve a problem of balancing loads of the DO system and the 1X system.

In the embodiment of the present invention, when the DO system is overloaded and the 1X system is not loaded, the HAT may switch the connection request sent in the DO system to the 1X system, establishes the data service of the 1X system, and performs data service processing in the 1X system. Compared with the prior art where the cooperation of the terminal is required to upgrade chips and the problem of balancing the loads of the DO system and the 1X system cannot be solved, the embodiment of the present invention is independently by a system network side, and it is required that the system network side controls switching of the HAT from the DO system to the 1X system for performing data service processing, rather than that a terminal user cooperate to upgrade terminal software, thereby achieving the load balance of the DO system and the 1X system.

Figure 6:
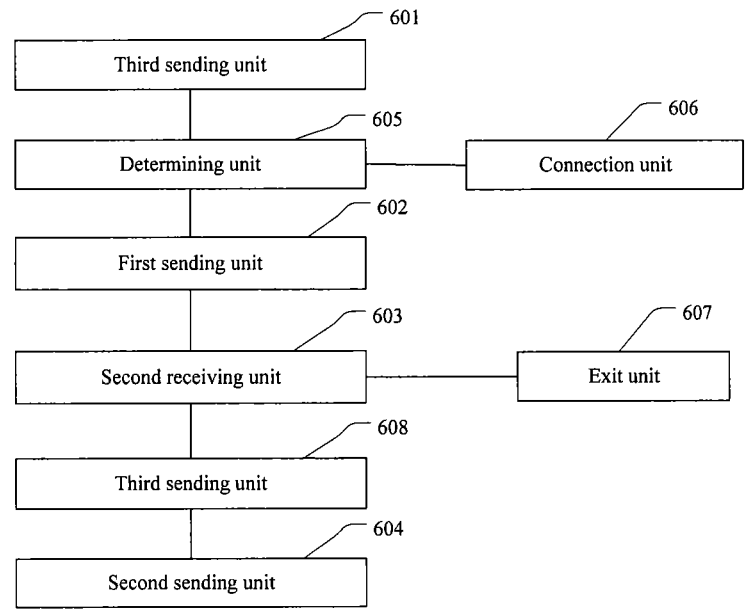
FIG. 6 is a block diagram of an apparatus for a load balance according to Embodiment 2 of the present invention.

This embodiment provides an apparatus for a load balance. The apparatus may be an AN of a DO system or a BSC in the AN of the DO system, as shown in FIG. 6. The apparatus includes a first receiving unit 601, a first sending unit 602, a second receiving unit 603, a second sending unit 604, a determining unit 605, a connection unit 606, an exit unit 607, and a third sending unit 608.

The first receiving unit 601 is configured to receive a connection request message sent by an HAT in a DO system. After the AN of the DO system receives the connection request message, the determining unit 605 determines whether a load of the DO system is higher than a first threshold.

The determining unit 605 is configured to determine whether the load of the DO system is higher than the first threshold; when the determining unit 605 determines that the load of the DO system is not higher than the first threshold, the connection unit 606 establishes a data service connection for the HAT in the DO system; and when the determining unit 605 determines that the load of the DO system is higher than the first threshold, the first sending unit 602 sends a load query message to a base station controller BSC of a 1X system.

The second receiving unit 603 is configured to receive a load query response message sent by the BSC of the 1X system, where the load query response message includes indication information indicating whether the 1X system is overloaded.

When the indication information indicates that the 1X system is overloaded, the exit unit 607 exits the connection request procedure of the HAT. When the indication information indicates that the 1X system is not overloaded, the third sending unit 608 sends a connection refuse message to the HAT to notify the HAT that a service connection cannot be established in the DO system. Then, the second sending unit 604 sends a system switchover message to the BSC of the 1X system to instruct the BSC of the 1X system to switch the HAT from the DO system to the 1X system for performing a data service.

In this embodiment, the AN of the DO system receives the connection request message sent by the HAT in the DO system, and then determines whether the DO system is overloaded. When the DO system is overloaded, a 1X system load query message is sent to the BSC of the 1X system. Then, when the query response message that is sent by the BSC of the 1X system and received by the AN of the DO system indicates that the 1X system is not overloaded, the HAT is switched from the DO system to the 1X system for performing a data service. Compared with the prior art where a problem of balancing loads of the DO system and the 1X system may not be solved, in the embodiment of the present invention, a switchover from the DO system to the 1X system for the load balance is implemented, thereby solving the problem of balancing the loads of the DO system and the 1X system.

Figure 7:
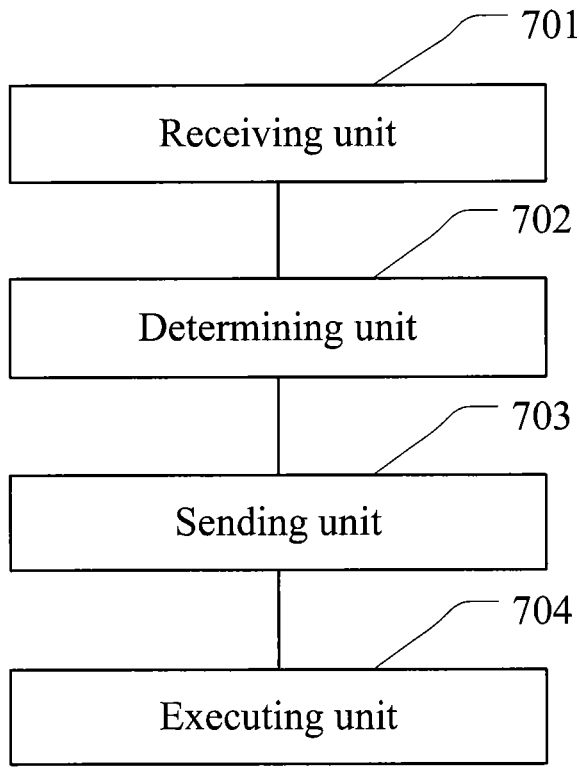
FIG. 7 is a block diagram of another apparatus for a load balance according to Embodiment 2 of the present invention.

This embodiment provides another apparatus for a load balance. The apparatus is a BSC of a 1X system, as shown in FIG. 7. The apparatus includes a receiving unit 701, a determining unit 702, a sending unit 703 and an executing unit 704.

The receiving unit 701 is configured to receive a load query message sent by an AN of a DO system.

After the receiving unit 701 receives the load query message sent by the AN of the DO system, the determining unit 702 determines whether a load of the 1X system is higher than a second threshold.

When the determining unit 702 determines that the load of the 1X system is not higher than the second threshold, the sending unit 703 sends, to the AN of the DO system, indication information indicating that the 1X system is not overloaded.

The executing unit 704 is configured to receive a system switchover message sent by the AN of the DO system, and switch the HAT from the DO system to the 1X system for performing a data service.

The sending unit 703 is further configured to, when it is determined that the load of the 1X system is higher than the second threshold, send, to the AN of the DO system, indication information indicating that the 1X system is overloaded.

In this embodiment, when the DO system is overloaded, the BSC of the 1X system receives the load query message sent by the AN of the DO system, and then the determining unit determines whether the load of the 1X system is higher than the second threshold. When the load of the 1X system is not higher than the second threshold, that is, when the 1X system is not overloaded, the HAT is switched from the DO system to the 1X system for performing a data service. In this way, a problem that a load balance of the DO system and the 1X system cannot be achieved in the prior art is solved, spectrum utilization efficiency is maximized, and user experience is improved.

The foregoing descriptions are merely exemplary embodiments of the present invention, but not intended to limit the protection scope of the present invention. Any variation or replacement easily figured out by persons skilled in the art within the disclosed technical scope of the present invention shall fall within the protection scope of the present invention. Therefore, the protection scope of the present invention shall be subject to the appended claims.

What is claimed is:

1. A method for controlling a load balance between a code division multiple access (CDMA) 2000 1X Evolution-Data Optimized (EV-DO) network and a CDMA2000 1X network, comprising:

receiving, by a base station controller (BSC) in the CDMA2000 1X EV-DO network, a connection request message sent by a terminal in the CDMA2000 1X EV-DO network;

determining, by the BSC in the CDMA2000 1X EV-DO network, that a load of the CDMA2000 1X EV-DO network is higher than a threshold;

sending, by the BSC in the CDMA2000 1X EV-DO network, a load query message for querying a load status of the CDMA2000 1X network to a BSC in the CDMA2000 1X network after determining that the load of the CDMA2000 1X EV-DO network is higher than the threshold;

receiving, by the BSC in the CDMA2000 1X EV-DO network, a load query response message sent by the BSC in the CDMA2000 1X network, wherein the load query response message indicates that the CDMA2000 1X network is not overloaded; and in responsive to the load query response message, sending, by the BSC in the CDMA2000 1X EV-DO network, a system switchover message to the BSC in the CDMA2000 1X network to instruct the BSC in the CDMA2000 1X network to switch the terminal from the CDMA2000 1X EV-DO network to the CDMA2000 1X network.

2. The method according to claim 1, further comprising:
sending, by the BSC in the CDMA2000 1X EV-DO network, a connection refuse message to the terminal to notify the terminal that a service connection corresponding to the connection request message cannot be established in the CDMA2000 1X EV-DO network.

3. The method according to claim 1, wherein if the number of users in a cell exceeds a configured number, the BSC in the CDMA2000 1X EV-DO network determines that the load of the CDMA 2000 1X EV-DO network is higher than the threshold.

4. A base station controller (BSC), comprising:
a processor; and
a non-transitory computer readable storage medium storing programming for execution by the processor, the programming including instructions to:
receive a connection request message sent by a terminal in a code division multiple access (CDMA) 2000 1X Evolution-Data Optimized (EV-DO) network;
determine that a load of the CDMA2000 1X EV-DO network is higher than a threshold;
after determining that the load of the CDMA2000 1X EV-DO network is higher than the threshold, send a load query message for querying a load status of a CDMA2000 1X network to a BSC in the CDMA2000 1X network;
receive a load query response message sent by the BSC in the CDMA2000 1X network, wherein the load query response message indicates that the CDMA2000 1X network is not overloaded; and
in responsive to the load query response message, send a system switchover message to the BSC in the CDMA2000 1X network to instruct the BSC in the CDMA2000 1X network to switch the terminal from the CDMA2000 1X EV-DO network to the CDMA2000 1X network.

5. The BSC according to claim 4, wherein if the number of users in a cell exceeds a configured number, the load of the CDMA 2000 1X EV-DO network is higher than the threshold.

6. The BSC according to claim 4, wherein the BSC sends a connection refuse message to the terminal to notify the terminal that a service connection corresponding to the connection request message cannot be established in the CDMA2000 1X EV-DO network.

7. A method for controlling a load balance between a code division multiple access (CDMA) 2000 1X Evolution-Data Optimized (EV-DO) network and a CDMA2000 1X network, comprising:
  receiving, by a base station controller (BSC) in the CDMA2000 1X network, a load query message for querying a load status of the CDMA2000 1X network sent by an access network of the CDMA2000 1X EV-DO network;
  in response to the load query message, determining, by the BSC, that the load of the CDMA2000 1X network is not higher than a threshold;
  after determining that the load of the CDMA2000 1X network is not higher than the threshold, sending, by the BSC, a load query response message indicating that the CDMA2000 1X network is not overloaded to the access network of the CDMA2000 1X EV-DO network;
  receiving, by the BSC, a system switchover message sent by the access network of the CDMA2000 1X EV-DO network; and
  in responsive to the system switchover message, switching, by the BSC, a terminal from the CDMA2000 1X EV-DO network to the CDMA2000 1X network.

8. The method according to claim 7, wherein the switching comprises:
  sending, by the BSC, a data service request message to a mobile switch center (MSC) in the CDMA2000 1X network in responsive to the system switchover message;
  receiving, by the BSC, a paging request message sent by the MSC;
  sending, by the BSC, the received paging request message to the terminal in the CDMA2000 1X EV-DO;
  receiving, by the BSC, a paging response message from the terminal; and
  in responsive to the paging response message, establishing, by the BSC, a data service connection in the CDMA2000 1X network for the terminal.

9. A base station controller (BSC), comprising:
  a processor; and
  a non-transitory computer readable storage medium storing programming for execution by the processor, the programming including instructions to:
  receive a load query message for querying a load status of a code division multiple access (CDMA) 2000 1X network from an access network of a CDMA2000 1X Evolution-Data Optimized (EV-DO) network;
  in response to the load query message, determine that the load of the CDMA2000 1X network is not higher than a threshold;
  after determining that the load of the CDMA2000 1X network is not higher than the threshold, send a load query response message indicating that the CDMA2000 1X network is not overloaded to the access network of the CDMA2000 1X EV-DO network;
  receive a system switchover message instructing the BSC to switch a terminal in the CDMA2000 1X EV-DO network to the CDMA2000 1X network, from the access network of the CDMA2000 1X EV-DO network; and
  in responsive to the system switchover message, switch the terminal from the CDMA2000 1X EV-DO network to the CDMA2000 1X network.

10. The BSC according to claim 9, wherein the switching comprises:
  sending a data service request message to a mobile switch center (MSC) in the CDMA2000 1X network in responsive to the system switchover message;
  receiving a paging request message sent by the MSC;
  sending the received paging request message to the terminal;
  receiving a paging response message from the terminal; and
  in responsive to the paging response message, establishing a data service connection in the CDMA2000 1X network for the terminal.

* * * * *